United States Patent [19]

Ogawa

[11] Patent Number: 5,065,172
[45] Date of Patent: Nov. 12, 1991

[54] ZOOM LENS CAMERA
[75] Inventor: Kimiaki Ogawa, Tokyo, Japan
[73] Assignee: Asahi Kogaku Kogyo Kabushiki Kaisha, Tokyo, Japan
[21] Appl. No.: 543,410
[22] Filed: Jun. 26, 1990
[30] Foreign Application Priority Data Jun. 30, 1989 [JP] Japan .................................. 1-168425

[51] Int. Cl.⁵ .............................................. G03B 1/12
[52] U.S. Cl. .................................................. 354/195.1
[58] Field of Search ..................................... 354/195.1

[56] References Cited

U.S. PATENT DOCUMENTS

| 4,329,029 | 5/1982 | Haskell | 354/289 X |
| 4,446,526 | 5/1984 | Iwanade | 364/525 |
| 4,868,592 | 9/1989 | Suzuki et al. | 354/400 |
| 4,936,664 | 6/1990 | Haraguchi et al. | 350/429 |
| 4,944,030 | 7/1990 | Haraguchi et al. | 350/403 |

FOREIGN PATENT DOCUMENTS

| 0921951 | 3/1963 | United Kingdom . |
| 1524497 | 9/1978 | United Kingdom . |
| 1532576 | 11/1978 | United Kingdom . |
| 1549729 | 8/1979 | United Kingdom . |

OTHER PUBLICATIONS

United Kingdom Search Report, Appln. No. 9014305.8, 9/25/90.
Abstract of International Publication No. WO87/07036, 11/19/87.
Abstract of International Publication No. WO87/07038, 11/19/87.

Primary Examiner—Michael L. Gellner
Attorney, Agent, or Firm—Sandler, Greenblum, & Bernstein

[57] ABSTRACT

A zoom lens camera enables an object to be photographed at a desired focal length. The camera is operated to set a focal length in a memory. The zoom lens is then driven to the setting that is stored in the memory. The focal length of the zoom lens is detected; and the driving of the zoom lens is controlled in accordance with the result of a comparison made between the value that is stored in the memory and the detected focal length of the zoom lens.

24 Claims, 10 Drawing Sheets

ZOOM LENS CAMERA

BACKGROUND OF THE INVENTION

1. Field of the Invention

The present invention relates to a zoom lens camera wherein a zoom lens is driven by a motor, or the like, to enable an object to be photographed with a desired focal length (angle of view).

2. Description of the Related Art

A zoom camera has a zoom lens that enables an object to be photographed with a desired focal length (angle of view) by moving the zoom lens to a given position.

The zoom lens can be moved either by a manual operation or automatically by means of a motor, or the like.

However, a typical conventional zoom lens camera is designed to set a given focal length (angle of view) by manually operating a zoom lever or operating a TELE or WIDE switch while checking the object through a finder or a monitor. Accordingly, it takes a great deal of time to repeatedly set a specific focal length with accuracy, and the prior art is therefore inconvenient.

SUMMARY OF THE INVENTION

In view of these circumstances, it is an object of the present invention to enable a specific focal length (angle of view) to be repeatedly set with accuracy and within a short period of time.

A zoom camera according to the present invention comprises: an operating means which is operated to set a focal length; a memory means for storing a focal length that is inputted through the operation of the operating means; a driving means for driving a zoom lens; a detecting means for detecting the focal length of the zoom lens; and a control means for controlling the driving means in accordance with the result of a comparison that is made between a value that is stored in the memory means and a value that is detected by the detecting means.

In the zoom camera having the above-described arrangement, a given focal length (angle of view) can be stored in the memory means, which comprises, for example, an EEPROM. The control means monitors the focal length of the zoom lens from the output of the detecting means and controls the driving means such that the zoom lens is stopped at a position where the monitored value equals the value stored in the memory means.

Accordingly, a specific focal length can be repeatedly set with great accuracy and within a short period of time.

BRIEF DESCRIPTION OF THE DRAWINGS

The invention will be described below with reference to the accompanying drawings, in which.

DESCRIPTION OF THE PREFERRED EMBODIMENTS

Figure 1:
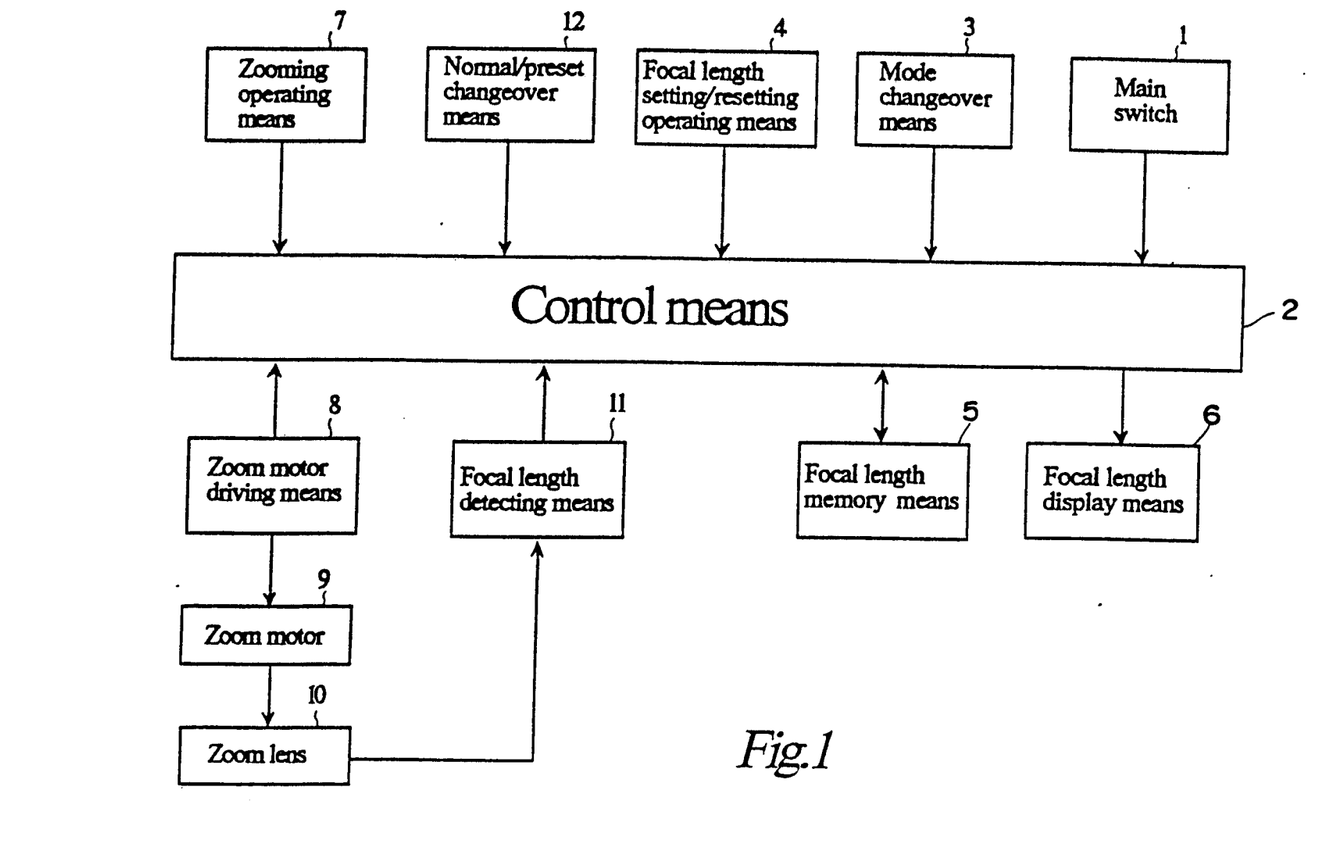
FIG. 1 illustrates a block diagram showing the arrangement of one embodiment of a zoom camera according to the present invention.

FIG. 1 is a block diagram showing the arrangement of one embodiment of a zoom camera according to the present invention.

In the figure, a main switch 1 is operated to turn ON/OFF a power supply for each circuit, means, etc. A control means 2 controls photographing operations of the camera. A mode changeover means 3 is operated to change the zoom camera from one mode to another mode. A memory means 5, which comprises, for example, a memory device, stores a focal length (angle of view) that is inputted through the operation of the operating means 4.

A display means 6 displays various information, such as the focal length. An operating means 7 is operated to perform zooming. A driving means 8 drives a zoom lens 10 through a zoom motor 9. A detecting means 11 detects and outputs the focal length (angle of view) of the zoom lens 10 to the control means 2. A changeover means 12 is operated to change the normal and preset zooming modes from one to the other.

Figure 2:
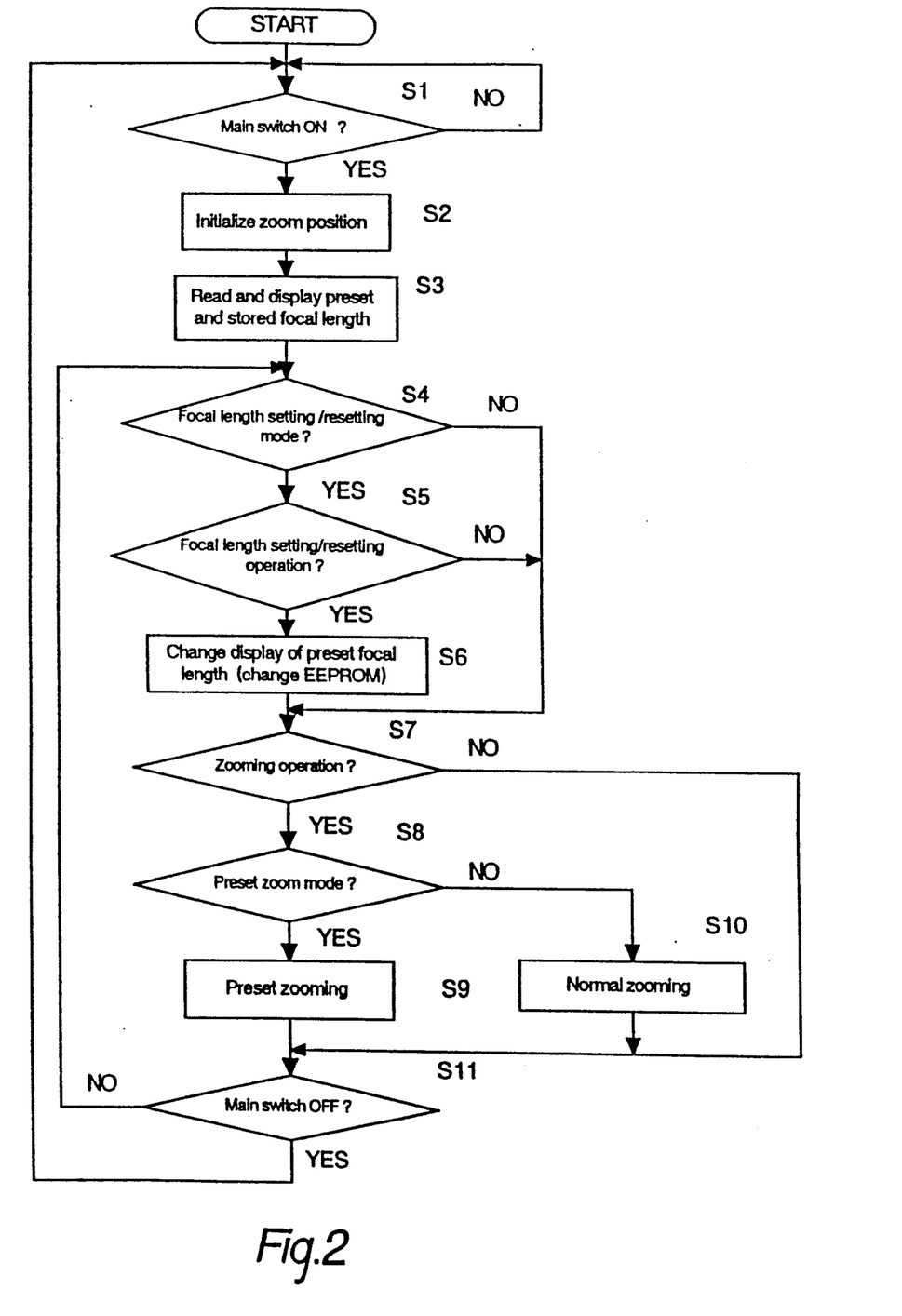
FIG. 2 illustrates a flowchart showing a main switch processing used in the embodiment shown in FIG. 1.

The operation of the camera now will be explained with reference to the flowchart of FIG. 2.

It is first determined whether the main switch 1 is ON. If the answer is "YES", the control means 2 executes an initialization of the zoom lens 12 (steps S1 and S2). Next, the control means 2 reads and displays on the display means 6 a preset focal length that has been stored in the memory means 5 (step S3).

Then, it is determined whether the changeover means 3 and the operating means 4 have been operated. If it is determined that these means have been operated to set the focal length setting/resetting mode and to input a focal length, the preset focal length is changed to the inputted focal length, which is then displayed on the display means 6 (steps S4 to S6).

Next, if it is determined whether that the operating means 7 has been operated, if it has, either a preset zooming process or the normal zooming process is executed in response to the operation of the mode changeover means 12 (steps S7 to S10).

The processings of Steps S4 to S10 are repeatedly executed as long as the main switch 1 is ON (steps S11).

Figure 3:
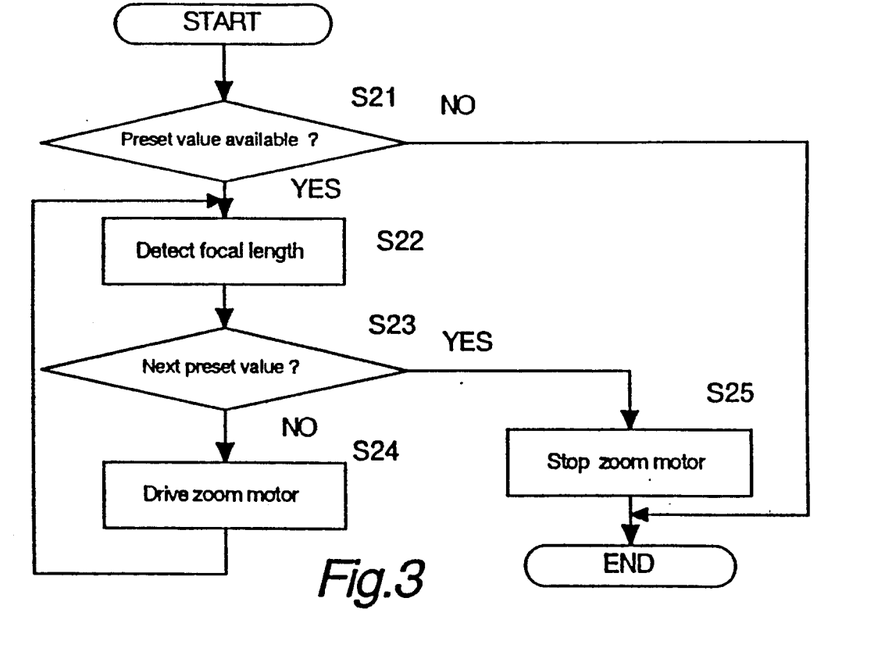
FIG. 3 illustrates a flowchart showing a preset zooming processing used in the flowchart of FIG. 2.

The above-described preset zooming process is executed according to the flowchart of FIG. 3.

It is first determined whether a given focal length has been preset in the memory means 5 (steps S21). If the answer is "YES", the focal length of the zoom lens 10 is detected from the output of the detecting means 11 (steps 22). The zoom motor 9 is driven until the detected value becomes equal to the preset value (steps S23 and S24). The zoom lens 10 is then stopped at a position where the focal length equals the preset value (step S25).

Figure 4:
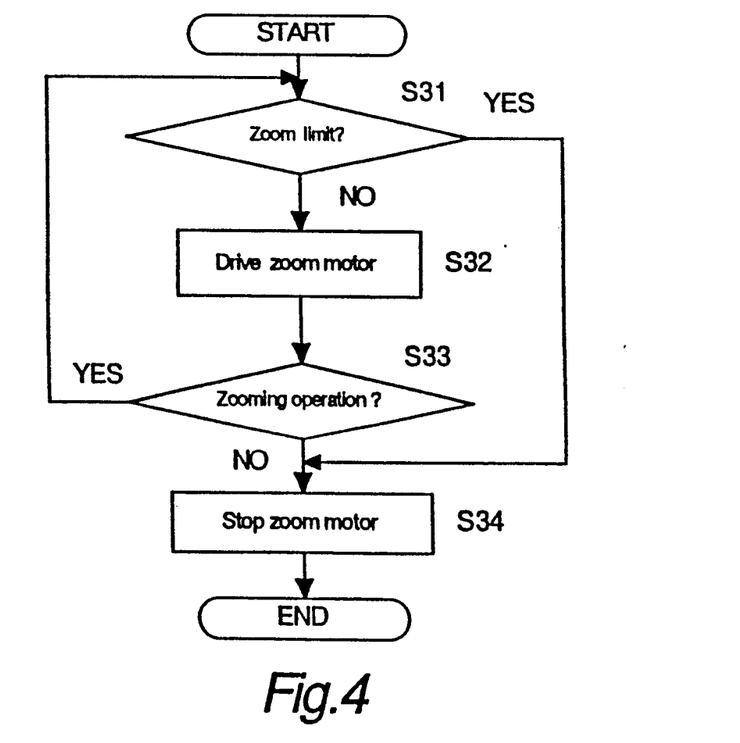
FIG. 4 illustrates a flowchart showing a normal zooming processing shown in FIG. 2.

On the other hand, the normal zooming process is executed according to the flowchart of FIG. 4.

In the normal zoom process, the zoom motor 9 is continuously driven until a limit switch (not shown), that constitutes a part of the detecting means 11, is turned ON. The drive of the zoom motor 9 is stopped when either the operation of the operating means 7 is suspended or when the limit switch is turned on ON (steps S31 to S34).

Figure 5:
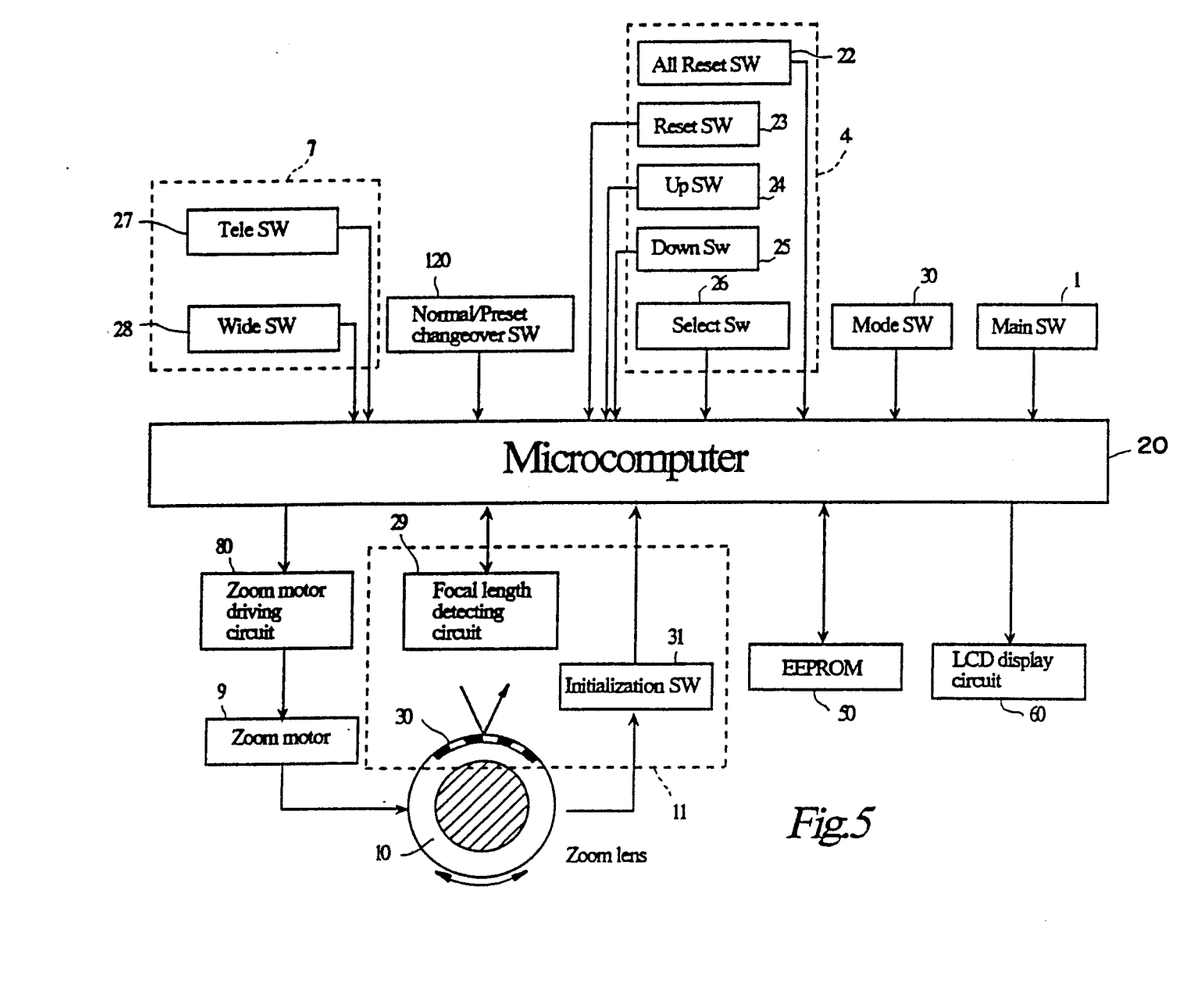
FIG. 5 illustrates a block diagram showing the arrangement of a second embodiment of a zoom camera according to the present invention.

FIG. 5 is a block diagram showing the arrangement of a second embodiment of the zoom camera according to the present invention.

In this embodiment, a microcomputer 20 is employed as the control means 2. A mode switch 30 serves as the mode changeover means 3. The following switches are provided as the operating means 4: an all reset switch 22, which is actuated to reset all the preset values; a reset switch 23, which is actuated to reset a given preset value; an up-switch 24 and a down-switch 25, which are actuated to increase or decrease a displayed value; and a select switch 26, which is actuated to select a mode.

An EEPROM 50 serves as the memory means 5, and an LCD display circuit 60 serves as the display means 6. The operating means 7, a TELE switch 27 and a WIDE switch 28. A driving circuit 80 serves as the driving means 8.

A detecting circuit 29 includes, for example, a photoreflector. The detecting circuit 29 applies light to an encoder 30, that is attached to the zoom lens 10, to detect the focal length (angle of view) of the zoom lens 10 on the basis of the reflected light therefrom. An initialization switch 31 detects the initial position of the zoom lens 10. These elements together comprise the detecting means 11.

A changeover switch 120 serves as the changeover means 12.

Figure 6:
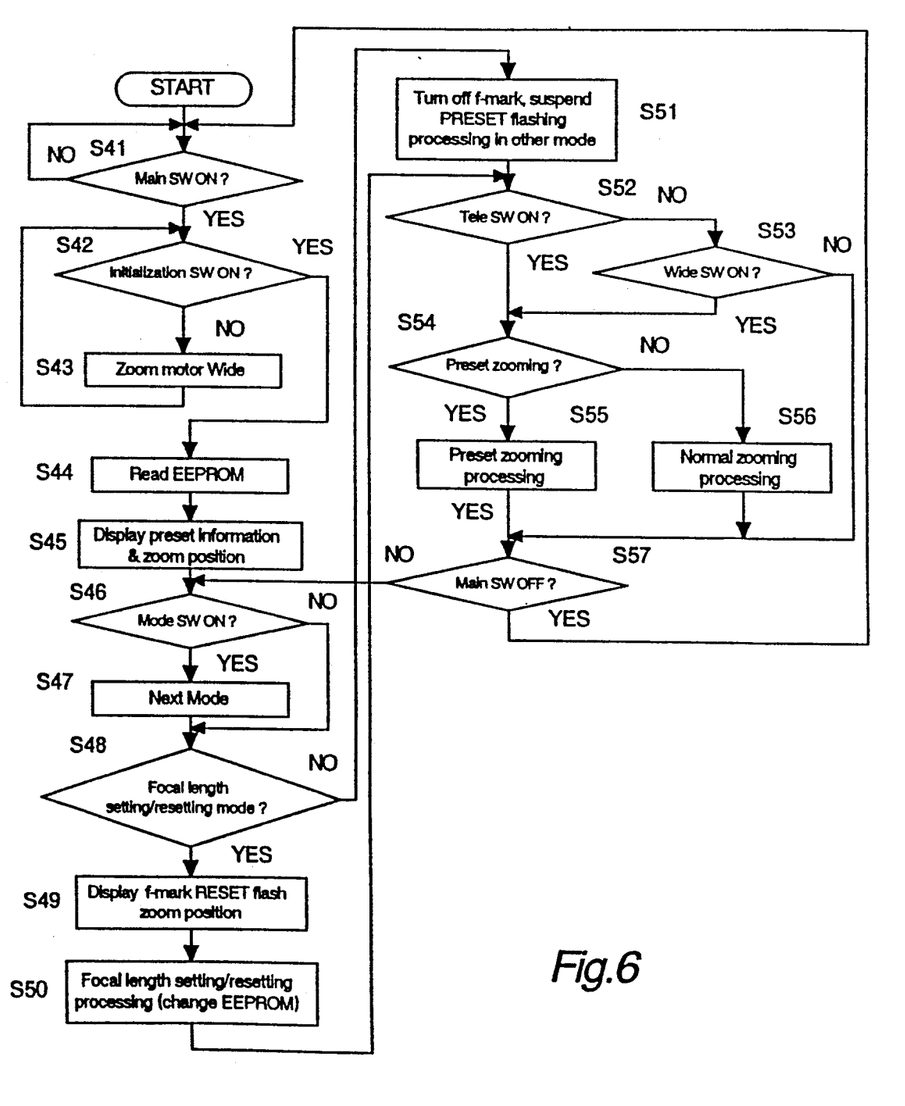
FIG. 6 illustrates a flowchart showing a main switch processing used in the embodiment shown in FIG. 5.

The operation will now be explained with reference to the flowchart of FIG. 6.

When the main switch 1 is turned ON, the zoom motor 9 is driven through the driving circuit 80 to move the zoom lens 10 in the WIDE direction until the initialization switch 31 is turned on ON (steps S41 to S43);

When the zoom lens 10 is moved to a position (initial position) at which the initialization switch 31 turns ON, a preset value that has been stored in the EEPROM 50 is read out and displayed on the LCD display circuit 60 (steps S44 and S45). At this time, the LCD display circuit 60 also displays the actual focal length (zoom position) of the zoom lens 10, which is detected by the detecting circuit 29 (step S45).

Figure 7A:
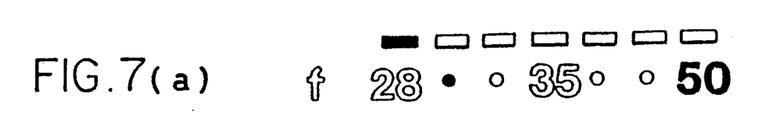
FIGS. 7(a), 7(b), 7(c), 7(d), 7(e), 7(f), 7(g), 7(h), 7(i), 7(j) and 7(k) show variations in the appearance of in the embodiment shown in FIG. 5.

FIG. 7(a) shows one example of the display on the LCD display circuit 60. In this example, a lighted position in rectangular bar-shaped patterns indicates the actual position of the zoom lens 10, and numerals (28, 35 and 50), which are arranged below the patterns, and dots, which are disposed therebetween, are used to indicate a preset value. In this example, the bar-shaped pattern at the left end is lit up, which indicates that the zoom lens 10 is disposed at the extremity in the WIDE direction (i.e., the initial position). In addition, the dot which is at the right-hand side of the numeral 28 and the numeral 50 itself are lit up, which means that the focal length has been preset to these values.

Figure 7B:
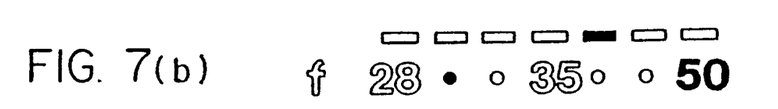

For example in which the normal zooming mode has been selected and set through the changeover switch 120, if the TELE switch 27 is turned ON in this state, the microcomputer 20 drives the zoom motor 9 through the driving circuit 80 to move the zoom lens 10 in the TELE direction. As a result the display on the LCD display circuit 60 changes, for example, to that shown in FIG. 7(b). The display at this time shows that the zoom lens 10 has been moved to a position corresponding to the focal length that is indicated by the pattern at the right-hand side of the numeral 35.

Figure 7C:
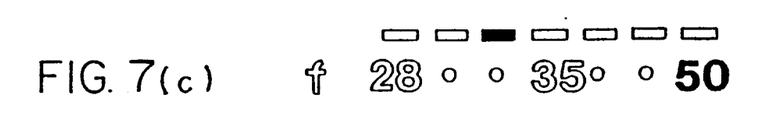

If the WIDE switch 28 is then turned ON, the display changes to that shown in FIG. 7(c). The display at this time shows that the zoom lens 10 has been moved to a position that is indicated by the pattern at the left-hand side of the numeral 35.

After such a display has been made, it is determined whether or not the mode switch 30 is ON. If it is turned ON, a next mode is set and displayed (steps S46 and S47).

Figure 8:
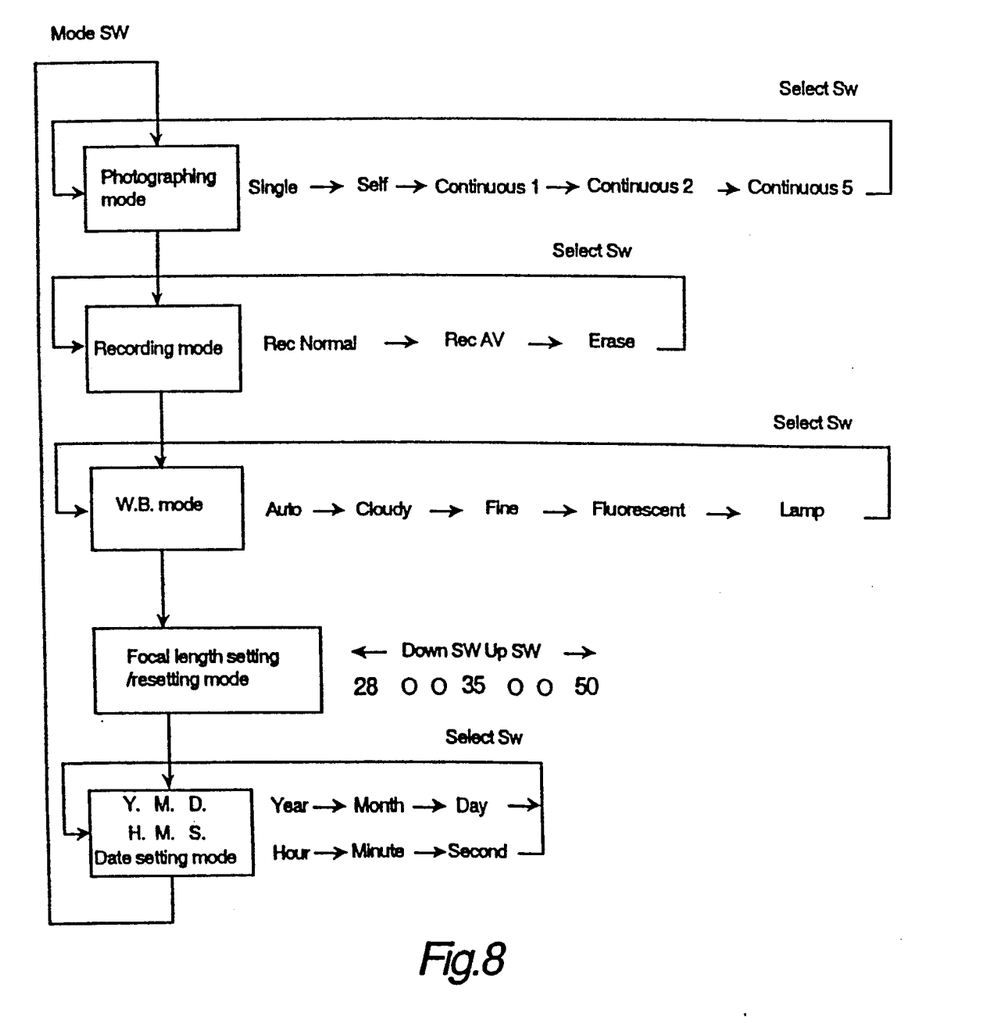
FIG. 8 shows several modes which are changed by the operation of a mode switch and a select switch in the embodiment shown in FIG. 5.

FIG. 8 shows modes which are changed by the operation of the mode switch 30.

As shown in the figure, every single operation of the mode switch 30 causes a "photographing mode", "recording mode", "W.B. (White Balance) mode", "focal length setting/resetting mode" and "date setting mode" to rotate stepwise in the mentioned sequence.

In the photographing mode, every single operation of the select switch 26 causes a "Single mode", "Self mode", "Continuous 1 mode", "Continuous 2 mode" and Continuous 5 mode" to rotate stepwise in the mentioned sequence.

Similarly, in the recording mode, "RecNormal", "RecAV" and "Erase modes" are rotated in the mentioned sequence; in the "W.B. mode", "Auto", "Cloudy", "Fine", "Fluorescent" and "Lamp" modes are rotated in the mentioned sequence; and in the date mode, either the sequence of year, month and day or the sequence of hour, minute and second is rotated in the mentioned order.

In the focal length setting/resetting mode, every single operation of the up-switch 24 or the down-switch 25 causes the lighted or flashing position to shift rightward or leftward stepwise between the numerals 28 and 50.

When a mode other than the focal length setting/resetting mode is set in response to the above-described operation of the mode switch 30, the processing of the set mode is executed (steps S41 and S51).

When the focal length setting/resetting mode is set, an f-mark is displayed and the indicator that corresponds to the position (zoom position) of the zoom lens 10 flashes for signaling RESET (hereinafter referred to as "RESET flashing") (step S49). If the focal length that corresponds to the position of the zoom lens has already been preset, the indicator flashes for signaling PRESET (hereinafter referred to as "PRESET flashing").

Figure 7D:
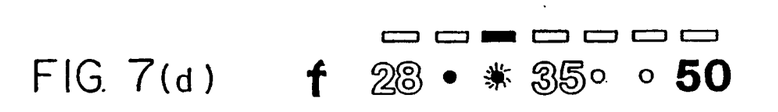

FIG. 7(d) shows the display that is made in this condition. In this example, the dot which is at the left-hand side of the numeral "35" is RESET flashing. RESET flashing herein means a flashing condition in which the "ON" time is shorter than the "OFF" time.

Next, the focal length setting/resetting process is executed (step S50).

Figure 9:
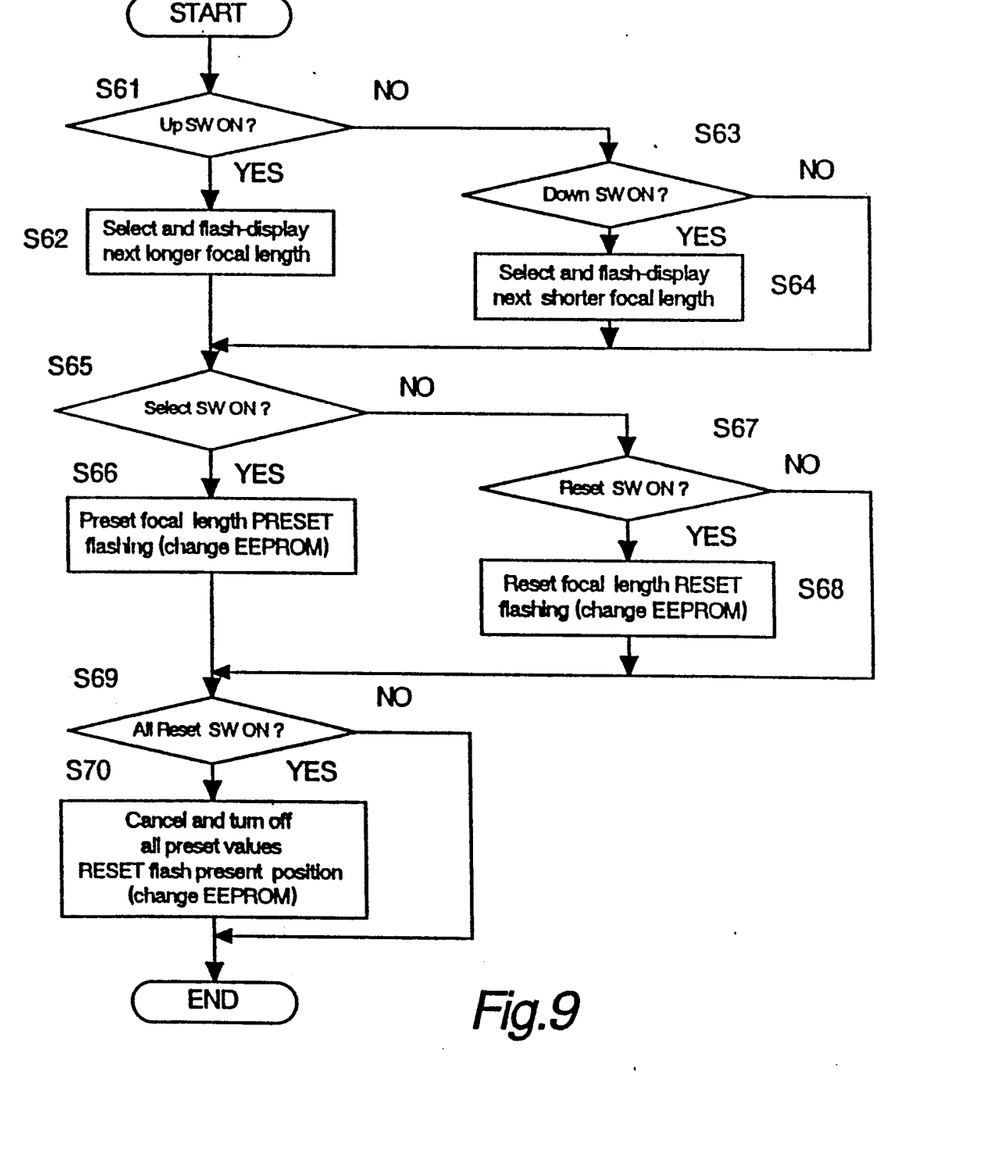
FIG. 9 illustrates a flowchart showing a focal length setting/resetting processing used in the flowchart of FIG. 6.

The details of this process are shown in the flowchart of FIG. 9.

First, it is determined whether the up-switch 24 or the down-switch 25 is ON. If the former is turned ON, a longer focal length is selected and displayed by flashing, whereas, if the latter is turned ON, a shorter focal length is selected and displayed by flashing (steps S61 to S64).

Figure 7E:
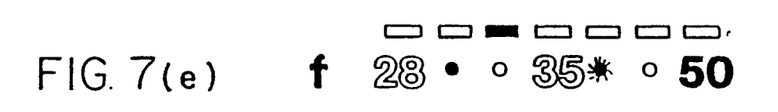
Figure 7F:
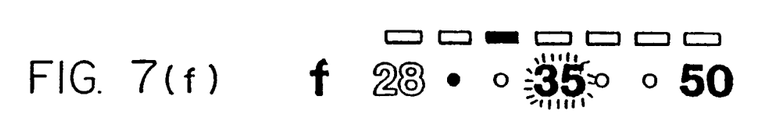

For example, if the up-switch 24 is operated twice when the setting is such as that shown in FIG. 7(d), the RESET flashing position shifts two steps rightward, as shown in FIG. 7(e), and if the down-switch 25 is then operated once, the "RESET" flashing position shifts one step leftward, as shown in FIG. 7(f).

Next, it is determined whether the select switch 26 or the reset switch 23 is ON. If the former is turned ON, PRESET flashing display is performed, whereas, if the latter is turned ON, RESET flashing display is performed (steps S65 to S68).

Figure 7G:
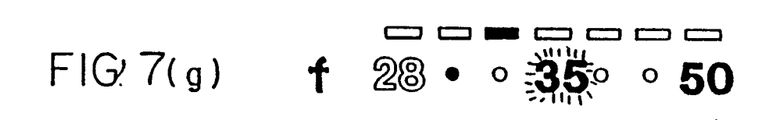

For example, if the select switch 26 is turned ON when the setting is as shown in FIG. 7(f), the numeral 35, which has being RESET flashing, changes the flashing mode to the PRESET flashing, as shown in FIG. 7(g). PRESET flashing herein means a flashing condition in which the "ON" time is longer than the "OFF" time.

The PRESET flashing means that the concerned value has been preset.

Figure 7H:
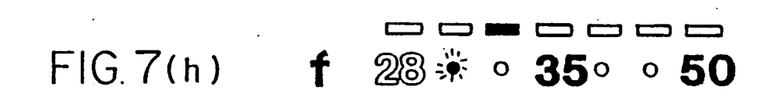

If the down-switch 25 is operated twice when the setting is as shown in FIG. 7(g), the PRESET flashing position shifts two steps leftward, as shown in FIG. 7(h). Since, in this case, the newly selected focal length has already been preset, the indicator concerned performs PRESET flashing.

Figure 7I:
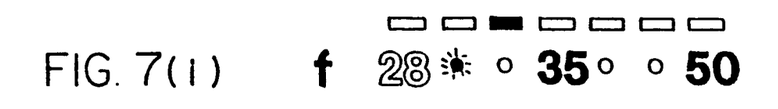

In addition, the numeral 35 is no longer flashing, but rather, is lit up. If the reset switch 23 is then operated, the presetting is canceled and the PRESET flashing changes to the RESET flashing, as shown in FIG. 7(i).

Figure 7J:
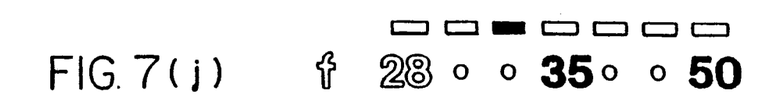

If, in this state, the mode switch 30 is operated to cancel the focal length setting/resetting mode, the values (i.e., the numerals 35 and 50 in this example) that have been preset by the operations conducted so far are displayed by being lit up, and the f-mark is turned OFF, as shown in FIG. 7(j).

Figure 7K:
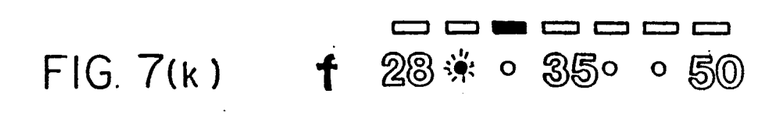

When the all reset switch 22 is turned ON, all the preset values are canceled, and the indicators corresponding to the values which have been preset so far are turned OFF, while the position which has been selected/canceled so far performs RESET flashing, as shown in FIG. 7(k), (steps S69 and S70).

After the focal length setting/resetting processing (step S50) has been completed in this way, it is determined whether the TELE switch 27 or the WIDE switch 28 is ON steps (S52 and S53). If either of these switches is turned ON, a zooming mode selected through the changeover switch 120 is examined, and either the preset zooming process or the normal zooming process is executed in accordance with the selection made via the changeover switch 120 (steps S54 to S56).

Figure 10:
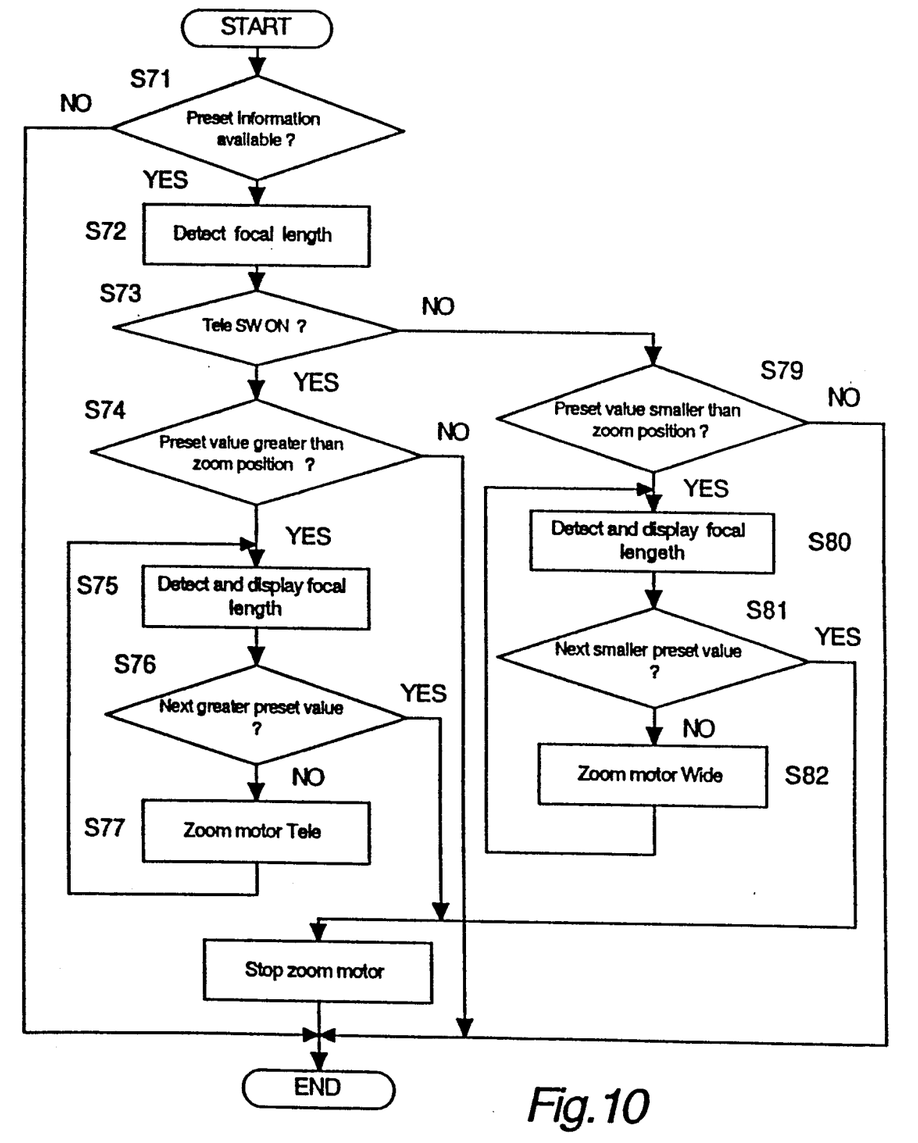
FIG. 10 illustrates a flowchart showing a preset zooming processing used in the flowchart of FIG. 6.

The preset zooming processing will now be explained with reference to the flowchart of FIG. 10.

If preset information has been stored in the EEPROM 50, the microcomputer 20 detects the focal length of the zoom lens 10 from the output of the detecting circuit 29 (steps S71 and S72). If the TELE switch 27 is turned ON, it is determined whether there is a preset value which is greater than the zoom position (steps S73 and S74).

If there is a preset value which is greater than the zoom position, the focal length is detected by the detecting circuit 29 and displayed on the LCD display circuit 60 (step S75). If the detected focal length is not equal to the greater preset value, the zoom lens 10 is moved in the TELE direction.

During the movement of the zoom lens 10, the detection of the focal length is periodically conducted, and the lighted position on the display shifts in response to the movement of the zoom lens 10 (steps S76 and S77). When the detected focal length coincides with the greater preset value, the movement of the zoom lens 10 is stopped (step S78).

On the other hand, if the WIDE switch is ON and there is a preset value which is smaller than the zoom position, the zoom motor 9 is driven in the WIDE direction to move the zoom lens 10 until the smaller preset value is reached (steps S79 and S82).

Figure 11:
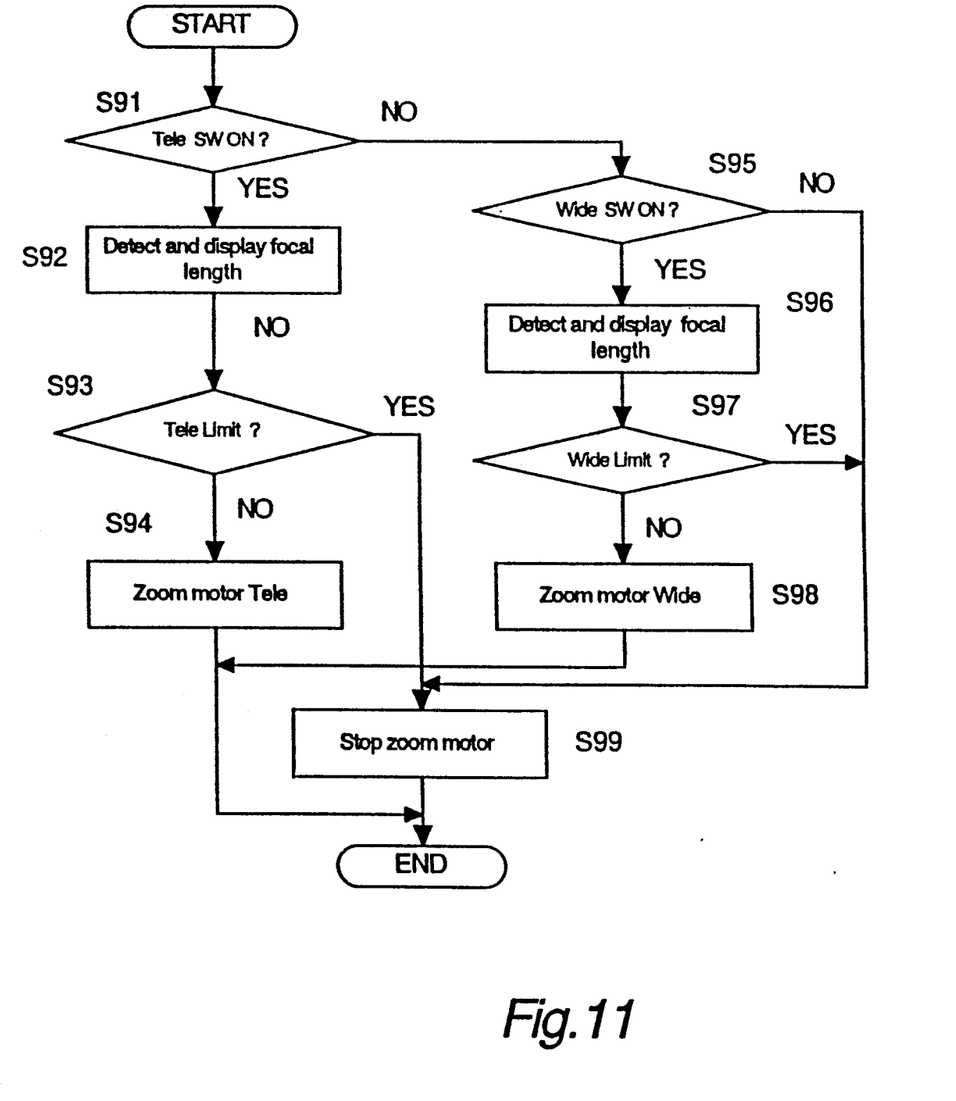
FIG. 11 illustrates a flowchart showing a normal zooming processing used in the flowchart of FIG. 6.

The normal zooming process will now be explained with reference to FIG. 11.

When the TELE switch 27 is turned ON, the zoom position is detected and displayed, and the zoom motor 9 is driven in the TELE direction as long as the limit switch (not shown) in the TELE direction is OFF (steps S91 to S94). When the limit switch is turned ON, the zoom lens 9 is stopped, since no more movement is allowed (step S99).

Similarly, when the WIDE switch 28 is turned ON, the zoom lens 10 is moved in the WIDE direction, as long as the limit switch (not shown) in the WIDE direction is OFF (steps S95 to S99).

If the main switch 1 is not OFF after the preset zooming processing (step S55) or the normal zooming processing (step S56) has been executed in this way, the processing of step S46 and those following it are repeated.

As has been described above, the zoom camera of the present invention is arranged such that it is possible to store a focal length (angle of view) in advance and automatically move the zoom position to the stored position.

Accordingly, a given focal length (angle of view) is repeatedly set with great accuracy and at a high speed.

I claim:
1. A zoom lens camera, comprising:
means for manually setting a plurality of focal lengths of a zoom lens associated with said zoom lens camera;
means for storing data corresponding to said manually set focal lengths; and
means for driving said zoom lens in accordance with said focal lengths set and stored by said focal length setting and storing means, wherein said zoom lens has WIDE and TELE focal length limits and said focal length setting may be set at any focal length between and including said limits.

2. A zoom lens camera according to claim 1, wherein said zoom lens camera is provided with a plurality of modes, one of which is a mode for releasing a focal length setting mode so that a setting of a focal length can be possible by said focal length setting means for setting a focal length of said zoom lens.

3. A zoom lens camera according to claim 2, further comprising a switch means by which said focal length setting means performs to set a focal length under a condition that said mode for releasing a focal length is selected.

4. A zoom lens camera according to claim 3, wherein said focal length setting means, in which a plurality of predetermined focal lengths are set, selects one of a plurality of predetermined focal lengths when said switch means is turned ON.

5. A zoom lens camera according to claim 1, further comprising means for manually zooming said driving means.

6. A zoom lens camera according to claim 1, further comprising means for manually zooming said driving means toward a TELE direction or a WIDE direction.

7. A zoom lens camera according to claim 1, further comprising means for indicating a focal length set by said focal length setting means.

8. A zoom lens camera according to claim 7, wherein said indicating means indicates an actual focal length of said zoom lens differently from a way in which said focal length set by said setting means is indicated.

9. A zoom lens camera, comprising:
means for driving a zoom lens associated with said zoom lens camera;
means for manually setting a plurality of focal lengths;
means for storing focal lengths set by said setting means; and
means for controlling said driving means in accordance with a focal length memorized in said storing means, wherein said zoom lens has WIDE and TELE focal length limits and said focal length setting may be set at any focal length between and including said limits.

10. A zoom lens camera according to claim 9, wherein said zoom lens camera is provided with a plurality of modes one of which is a mode for releasing a focal length setting mode so that a setting of a focal length can be possible by said focal length setting means for setting a focal length of said zoom lens.

11. A zoom lens camera according to claim 10, further comprising a switch means by which said focal length setting means sets a focal length under a condition that said mode for releasing a focal length is selected.

12. A zoom lens camera according to claim 11, wherein said focal length setting means, in which a plurality of predetermined focal lengths are set, selects one of a plurality of predetermined focal lengths when said switch means is turned ON and stores said selected focal length in said storing means.

13. A zoom lens camera according to claim 9, further comprising means for manually zooming said driving means.

14. A zoom lens camera according to claim 9, further comprising means for manually zooming said driving means toward a TELE direction or a WIDE direction.

15. A zoom lens camera according to claim 9, further comprising means for indicating a focal length stored in said storing means.

16. A zoom lens camera according to claim 15, wherein said indicating means indicates an actual focal length of said zoom lens in a manner different from a way in which said focal length stored in said storing means is indicated.

17. A zoom lens camera, comprising:
means for manually setting a plurality of focal lengths of a zoom lens associated with said zoom lens camera;
means for storing focal lengths of said zoom lens that are inputted through an operation of said setting means;
means for driving said zoom lens;
means for detecting said focal length of said zoom lens; and
means for controlling said driving means in accordance with the result of a comparison made between a value that is stored in said storing means and a value that is detected by said detecting means, wherein said zoom lens has WIDE and TELE focal length limits and said focal length setting may be set at any length between and including said limits.

18. A zoom lens camera according to claim 17, wherein said zoom lens camera is provided with a plurality of modes, one of which is a mode for releasing a focal length setting mode so that a setting of a focal length can be possible by said focal length setting means for setting a focal length of said zoom lens.

19. A zoom lens camera according to claim 18, further comprising a switch means by which said focal length setting means operates to set a focal length of said zoom lens under a condition that said mode for releasing a focal length is selected.

20. A zoom lens camera according to claim 19, wherein said focal length setting means, in which a plurality of predetermined focal lengths are set, selects one of a plurality of predetermined focal lengths when said switch means is turned ON, said selected focal length being stored in said storing means.

21. A zoom lens camera according to claim 17, further comprising a means for manually zooming said driving means.

22. A zoom lens camera according to claim 17, further comprising means for manually zooming said driving means toward a TELE direction or a WIDE direction.

23. A zoom lens camera according to claim 17, further comprising means for indicating a focal length stored in said storing means.

24. A zoom lens camera according to claim 23, wherein said indicating means indicates an actual focal length that is detected by said detecting means in a manner that is different from a way in which said focal length stored in said storing means is indicated.

* * * * *

UNITED STATES PATENT AND TRADEMARK OFFICE
CERTIFICATE OF CORRECTION

PATENT NO. : 5,065,172
DATED : November 12, 1991
INVENTOR(S) : K. OGAWA

It is certified that error appears in the above-indentified patent and that said Letters Patent is hereby corrected as shown below:

At column 8, line 45 (claim 21, line 2), after "comprising" delete "a".

Signed and Sealed this

Fifth Day of November, 1996

Attest:

BRUCE LEHMAN

*Attesting Officer*     *Commissioner of Patents and Trademarks*